United States Patent [19]
Eichweber

[11] Patent Number: 4,689,016
[45] Date of Patent: Aug. 25, 1987

[54] FIRING SIMULATOR FOR PRACTICING AIMING WITH A FIREARM

[75] Inventor: Kurt Eichweber, Hamburg, Fed. Rep. of Germany

[73] Assignee: Precitronic Gesellschaft fur Feinmechanik und Electronic mbH, Hamburg, Fed. Rep. of Germany

[21] Appl. No.: 812,316

[22] Filed: Dec. 23, 1985

[30] Foreign Application Priority Data

Dec. 31, 1984 [DE] Fed. Rep. of Germany ....... 3447887

[51] Int. Cl.$^4$ .............................................. F41G 3/26
[52] U.S. Cl. ........................................ 434/22; 434/21
[58] Field of Search ................................... 434/21, 22

[56] References Cited

U.S. PATENT DOCUMENTS

| | | | |
|---|---|---|---|
| 4,011,789 | 3/1977 | Bresee, Jr. et al. | 356/4 |
| 4,302,191 | 11/1981 | Weibull | 434/20 |
| 4,464,115 | 8/1984 | Simpson et al. | 434/21 |

FOREIGN PATENT DOCUMENTS 2841622 10/1982 Fed. Rep. of Germany .

OTHER PUBLICATIONS

Hermann Franke, "*Lueger Lexikon der Technik*", vol. 14, p. 12, 1969.

*Primary Examiner*—Leo P. Picard
*Attorney, Agent, or Firm*—Handal & Morofsky

[57] ABSTRACT

Device for practicing aiming with a firearm at a target, which device includes an optical sighting system and an arrangement for the determination of the simulated hit position in relation to the target position. In order to achieve a direct comparison with the image of the target perceived in the optical sighting system and the point of impact, it is provided that the hit position is displayed in the optical sighting system. For this purpose, the target is recorded by a TV camera, and a corresponding monitor image is reflected into the optical sighting system.

7 Claims, 1 Drawing Figure

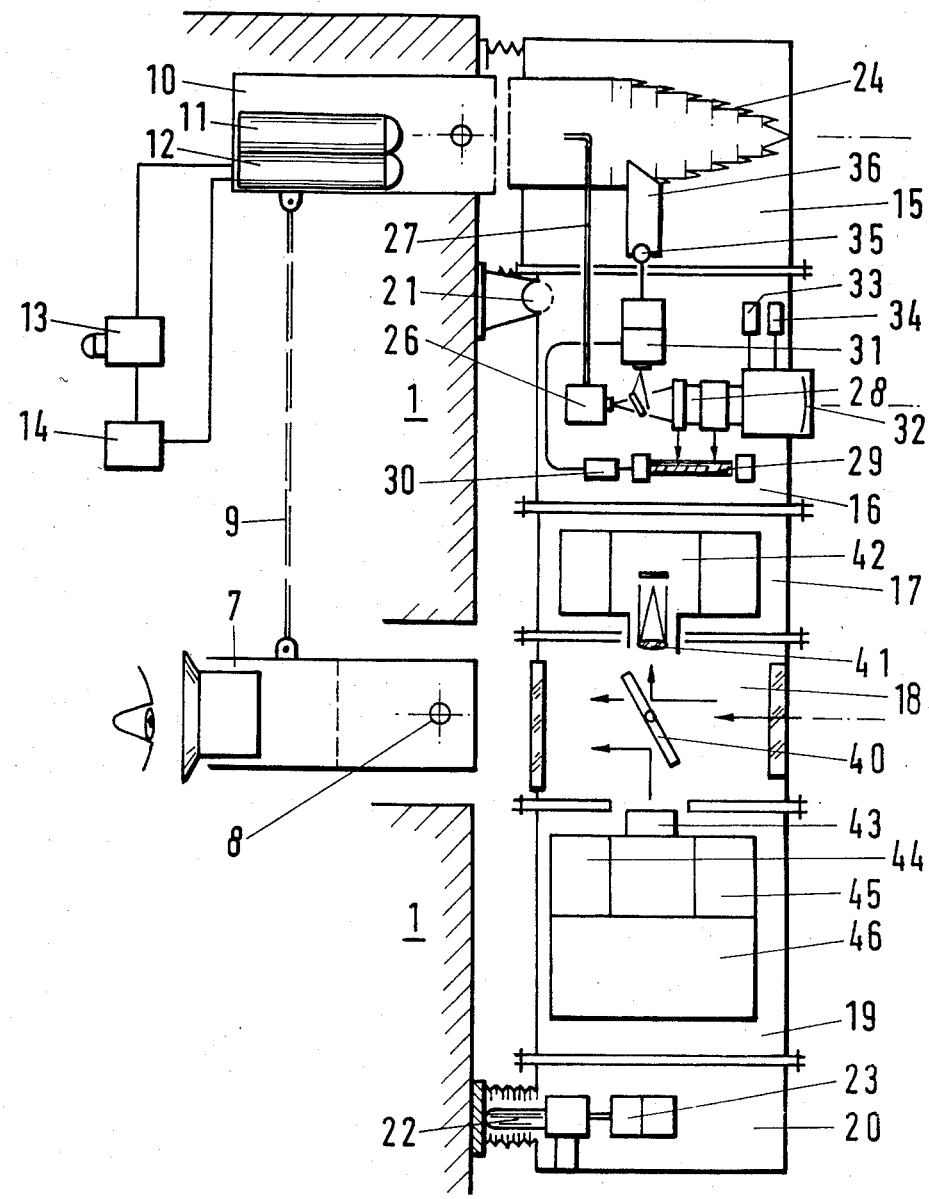

FIRING SIMULATOR FOR PRACTICING AIMING WITH A FIREARM

FIELD AND BACKGROUND OF THE INVENTION

The invention relates to a firing simulator for practising aiming with a firearm exhibiting a laser range finder, which simulator includes an arrangement, based on the emission and the reception of electromagnetic radiation, for the measurement of a cooperative target.

The object of a firing simulator is in the course of practice aiming and on manoeuvres to simulate accurate firing by means of a measurement process which is intended to give information on the probable plotted hits. In this connection, it is important that practice should be able to take place with the use of the weapon itself and that the properties of the latter should be altered to the smallest possible extent by the firing simulator.

Known firing simulators require mechanical or electrical control connections between weapon and simulator, which serve for the triggering of the measurement process on the simulator side and thus require, on using the weapon for practice purposes, certain interference with the weapon system, which can be difficult or unacceptable in particular in circumstances in which a weapon with a firing control system which is to a large extent automatedis involved, in such firing control system the triggering of the distance measurement being automatically followed by the triggering of firing.

SUMMARY OF THE INVENTION

The object of the invention is to provide a firing simulator of the initially described kind, which makes possible practice with such a weapon system practically without alteration of the same.

The solution according to the invention consists in that the firing simulator is arranged for the direct reception of the laser beam emanating from the weapon system and its measurement process is triggerable thereby.

The invention dispenses with control connections, which would require any alterations whatsoever in relation to the weapon system, and even permits the weapon system also to be left unchanged as regards the emission of the measurement laser beam, because this laser beam itself effects such connection. For the equipping of the weapon with the firing simulator, and for its adaptation for practice purposes, the firing simulator simply needs to be fitted thereto in such a manner that it can receive the laser beam emitted by the weapon. If the objective of the laser beam emitter is disposed at the weapon in such a manner that the firing simulator can be secured in the immediate vicinity of the same, a receiver for the laser beam on the weapon side, which covers the objective, can be integrated into the firing simulator. In place of this, a separate receiver can also be present, which can be fitted at the objective and is connected with the simulator by means of any control connection.

It would indeed be conceivable that the simulator should on its part make active use of a part of the laser beam received from the weapon, by converting it and emitting it for measurement purposes. However, it is in general more expedient if the simulator is equipped with its own laser beam emitter, which is only triggered by the reception of the laser beam on the weapon side. As a result of this, the firing simulator becomes independent of the laser beam received from the weapon, as regards its measurement function.

The laser beam generated by the weapon system in the case of combat has a high intensity such as to cause damage to the eyes, and must therefore not be emitted under practice conditions. It is therefore expedient to connect the receiving arrangement on the simulator side with an arrangement for screening off this laser beam. On the other hand, the laser beam emitted by the firing simulator can have a substantially lower intensity below the eye damage threshold, because it is cooperating with a so called cooperative target, which is equipped with one or more retroreflectors which send back the received light in the direction of origin.

In many cases, for example in the case of practice for emergency operation, it is not necessary or desired to involve components On the weapon side in the measurement process after triggering of the simulated firing. In other cases, it can however be expedient to maintain in full the operation of the weapon system with the exception of the firing itself, in particular the operation of the range finder on the weapon side. For this purpose, it can be provided according to the invention that the distance measurement echo signal received by the firing simulator can be transmitted to the range finding laser receiver on the weapon side. Rather than direct transmission of the laser beam echo received by the simulator, in general indirect transmission is to be preferred, in particular by means of an arrangement, triggerable by the reception of the range finding echo, for the generation of a laser beam which can be received on the weapon side.

Since the accuracy of the measurement is dependent upon the divergence of the laser beam used for measurement, it can be provided according to the invention that a distance-compensating optical system is employed, which sets the divergence of the beam in each instance in such a manner that it possesses a specific, optimal size of cross-section in the target region. It can thus, for example, be provided that in the target region it exhibits a size of cross-section of 4×4 m, independent of the respective distance. The expression "laser beam" is intended, in this connection, to cover also a pencil of rays or a beam matrix, which is produced by scanning movement of an individual beam or by composition from a multiplicity of individual beams.

Expediently, the firing simulator is correctable in relation to the weapon by the angle of elevation, in order to balance the superelevation, corresponding to the ballistic path curvature, of the barrel bore axis in relation to the target line.

BRIEF DESCRIPTION OF THE DRAWING

The invention will be explained in greater detail hereinbelow with reference to the drawing, the sole FIGURE of which shows a schematic longitudinal section.

DESCRIPTION OF THE PREFERRED EMBODIMENT

The fire screen 1 contains the optical sighting system 7, the movement of which about the axis 8 is transmitted via the connection 9 to the laser range finder 10, which is likewise contained in the fire screen and which is intended for range finding under combat conditions and includes a laser emitter 11 and a range finder receiver 12, which is connected in a conventional manner with the trigger 13 and the weapon sighting system indicated only generally at 14.

In front of the firescreen 1 there is disposed the firing simulator, which is composed of the modules 15 to 20 which are fixedly flanged to one another and is connected with the firescreen on the one hand via the joint 21 and on the other hand is supported against the same by the support pin 22, which is adjustable by means of the motor 23 for the compensation of the angle of elevation (superelevation).

Module 15 of the simulator includes an element 24 for the absorption of the laser beam which is generated by the device 10 after actuation of the trigger 13 and which is too intense for practice purposes, which element is indicated in the form of a bellows, but can have any nature appropriate for the indicated purpose.

Module 16 of the firing simulator contains a laser emitter 26, which is sufficient for practice purposes and which can be triggered via the component 27 by the laser beam generated by the laser device 10. The laser beam generated in this manner passes in the first instance through a vario-optical system 28, which—automatically controlled by the distance measurement—sets the divergence of the laser beam or pencil of rays in such a manner that the cross-section thereof has a predetermined size invariably or at least within a substantial distance range in the target plane. For this purpose, the setting of the two elements of the optical system 28 along the optical axis is determined by a threaded rod 29, which is controllable by means of the motor 30 in dependence upon a signal emanating from the range finder unit 31.

The laser beam further passes through the optical system 32, which is adjustable by means of the motors 33, 34 about two mutually perpendicular axes in such a manner that the axis of the emerging laser beam is angularly adjustable, namely for the performance of a searching and/or following function.

The described optical system also serves for the reception of the signal which is sent back from the retro-reflector on the target side and which is fed via a beam splitter to the range finder unit 31, which supplies the distance measurement data required in the simulator, inter alia for the adjustment of the vario-optical system 28 and, where appropriate, for the compensation of the superelevation of the simulator in relation to the weapon (fire screen 1), in order to ensure that, in spite of the ballistically conditioned superelevation of the barrel, the laser beam can be directed to the target. Moreover, immediately on arrival of the laser echo, the range finder unit 31 causes the lighting of a diode 35, the light signal of which is fed via the prism 36 to the range finder receiver 12 of the laser device 10. In this manner, the weapon system, in particular the computer of the weapon sighting system 14, also receives the distance measurement data required, so that the weapon system can be used in such a manner as if the firing simulator were not present.

The range finder unit 31 of the simulator is only actuated for a short period of time on commencement of the practice procedure, namely for the range finding operation. When, following this, the laser is used for other purposes within the context of the simulation process, namely for the measurement of the target location, the range finder unit is expediently switched off, in order not to give rise to erroneous signals.

Module 18 of the firing simulator is connected in front of the optical sighting system 7 and includes a very thin beam splitter 40, the vapour-deposited coating of which is expediently chosen in such a manner that the light coming in from outside is for practical purposes not reflected in the visible spectral range and the mirror in the optical sighting system is accordingly not perceived. The normal operation of the optical sighting system is thus not impaired by the firing simulator. On the other hand, the infrared range of the laser light employed is reflected, and this is indeed fed to the objective 41 of a TV camera 42 contained in the module 17.

In the module 19 there is disposed a TV monitor 43, the image of which is reflected via the rear surface of the beam splitter 40 into the optical sighting system 7. The marksman accordingly also perceives within the target field perceived by him directly through the optical sighting system the symbols appearing on the monitor 43.

With the monitor 43 there is associated a store 44 and a symbol generator 45 for symbol or phantom images, as well as a computer 46.

On commencement of the practice procedure, the distance measurement takes place in the first instance, with subsequent adjustment of the vario-optical system 28. In automatic operation of the weapon system, the superelevation of the weapon is also set by the weapon sighting system. Since from the point of view of the firing simulator only the target line is of importance, the superelevation is again compensated at the firing simulator by adjustment of the support pin 22. If the superelevation is smaller than one half of the angle of divergence of the laser beam, this can possibly be dispensed with, because the illumination of the target is guaranteed, even without such compensation. The superelevation must of course, in these circumstances, be taken into consideration in the measurement of the target position. At all events, it is important that the laser beam generated and received in the module 16 remains directed to the target or, in the case of the scanning function, sweeps over the target, in order to be able to establish the position of the target in relation to the hit position.

The signal resulting therefrom indicates the sighting error, and is utilized for the control of the monitor image in such a manner that the marksman perceives the supposed flash of the hit in the optical sighting system at that position of the image observed in the optical sighting system at which the point of impact of the projectile (related to the target plane) would be disposed.

The mirror 40, which is used as a beam splitter in front of the optical sighting system, can be pivotable out of the path, in order to be able to eliminate the monitor image in its entirety in the event of faults.

With the application of appropriate beam splitters, the optical systems in the modules 16 and 18 can be integrated into one another, in order to avoid displacement of the axes.

I claim:

1. A firing simulator for practicing aiming with a firearm provided with a laser range finder, which simulator includes an arrangement, based on the emission and the reception of electromagnetic radiation, for the measurement of a cooperative target, the firing simulator includes means for the direct reception of said laser beam emanating from the weapon and, means for triggering the measurement process of said arrangement by said laser beam further including a built in laser beam emitter.

2. A firing simulator according to claim 1, further comprising an arrangement for the screening off of the laser beam emanating from the weapon.

3. A firing simulator according to claim 1, further comprising means for transmitting the range finding echo signal received by said simulator to the range finding laser receiver on the weapon side.

4. A firing simulator according to claim 3, including an arrangement, triggerable by the reception of the range finding echo signal for the generation of laser radiation, and means for receiving said radiation on the weapon side.

5. A firing simulator according to claim 2, comprising a laser beam emitter (16) including a distance-compensating optical system (28) for maintaining the size of the cross-section of the laser beam substantially constant.

6. A firing simulator according to claim 1 adapted to be fitted on the fire screen of a gun.

7. A firing simulator according to claim 1, wherein the elevation of said simulator is correctable in relation to the weapon by the superelevation of the barrel of said weapon.

* * * * *